(12) United States Patent
Bolli et al.

(10) Patent No.: US 6,229,301 B1
(45) Date of Patent: May 8, 2001

(54) ELECTRONIC CIRCUIT AND METHOD FOR A DIMENSION-MEASURING DEVICE

(75) Inventors: Jean-Luc Bolli, Genève; Pascal Jordil, Ecoteaux, both of (CH)

(73) Assignee: Brown & Sharpe Tesa SA, Renens (CH)

(*) Notice: Subject to any disclaimer, the term of this patent is extended or adjusted under 35 U.S.C. 154(b) by 0 days.

(21) Appl. No.: 09/212,478

(22) Filed: Dec. 16, 1998

(30) Foreign Application Priority Data

Dec. 22, 1997 (EP) .................................................. 97811006

(51) Int. Cl.[7] ........................................................ G01B 7/14
(52) U.S. Cl. .............................. 324/207.21; 324/207.24; 338/32 R
(58) Field of Search ....................... 324/207.21, 207.24, 324/207.2, 207.19, 207.13, 207.12, 252; 338/32 R; 73/597

(56) References Cited

U.S. PATENT DOCUMENTS

| | | | |
|---|---|---|---|
| 4,404,523 | * 9/1983 | Hughes et al. | 324/207 |
| 4,594,548 | * 6/1986 | Takahashi et al. | 324/208 |
| 5,036,276 | * 7/1991 | Aizawa | 324/207.21 |
| 5,047,716 | * 9/1991 | Katagiri | 324/207.21 |
| 5,243,280 | * 9/1993 | Kusumi | 324/207.21 |
| 5,386,642 | 2/1995 | Spies et al. | 33/708 |

FOREIGN PATENT DOCUMENTS

| | | |
|---|---|---|
| 4233331 | 4/1994 | (DE) . |
| 0493260 | 7/1992 | (EP) . |
| 0626562 | 11/1994 | (EP) . |
| 0877228 | 11/1998 | (EP) . |
| 56-169207 | 5/1955 | (JP) . |
| 56-37511 | 4/1981 | (JP) . |
| 57-171204 | 10/1982 | (JP) . |
| 58-52501 | 3/1983 | (JP) . |
| 58-56980 | 4/1983 | (JP) . |
| 59-112222 | 6/1984 | (JP) . |
| 4-131712 | 5/1992 | (JP) . |
| 4-301718 | 10/1992 | (JP) . |
| 6-2115 | 1/1994 | (JP) . |
| 6-194111 | 7/1994 | (JP) . |
| 7-55502 | 3/1995 | (JP) . |

OTHER PUBLICATIONS

Patent Abstracts of Japan, vol. 13, No. 520, Nov. 21, 1989 and JP 01 212313 A (Sankyo Seiki Mfg Co Ltd).

Patent Abstracts of Japan, vol. 10, No. 382, Dec. 20, 1986 and JP 61 173113 A (Akai Electric Co Ltd).

Patent Abstracts of Japan, vol. 18, No. 28, Jan. 17, 1994 and JP 05 258244 A (Fujitsu Ltd).

Patent Abstracts of Japan, vol. 18, No. 144, Mar. 10, 1994 and JP 05 327060 A (Mitsubishi Materials Corp).

* cited by examiner

Primary Examiner—Christine K. Oda
Assistant Examiner—Subhash Zaveri
(74) Attorney, Agent, or Firm—Jacobson, Price, Holman & Stern, PLLC

(57) ABSTRACT

The electronic circuit (3) comprises an electric feed circuit (42) supplying at least one feed voltage ($E_P E_N$) intended to feed a network of magnetoresistive electrodes (100) and a measuring circuit (30–39) including two differential inputs (C, C', S, S') connected to the network. The measuring circuit uses a rough counter and a fine interpolation circuit to determine the position of the sensor along the scale on the basis of the two sinusoidal input signals received. The feed circuit periodically reduces the electric feed voltage supplied so as temporarily to lessen the dissipation of energy in the magnetoresistive electrodes.

30 Claims, 6 Drawing Sheets

FIG. 7
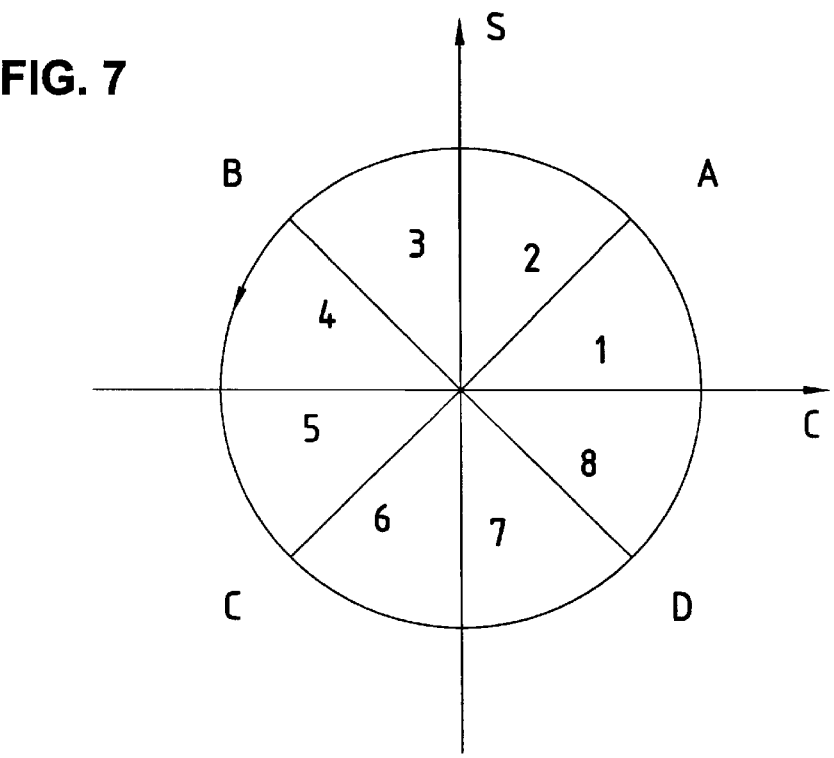
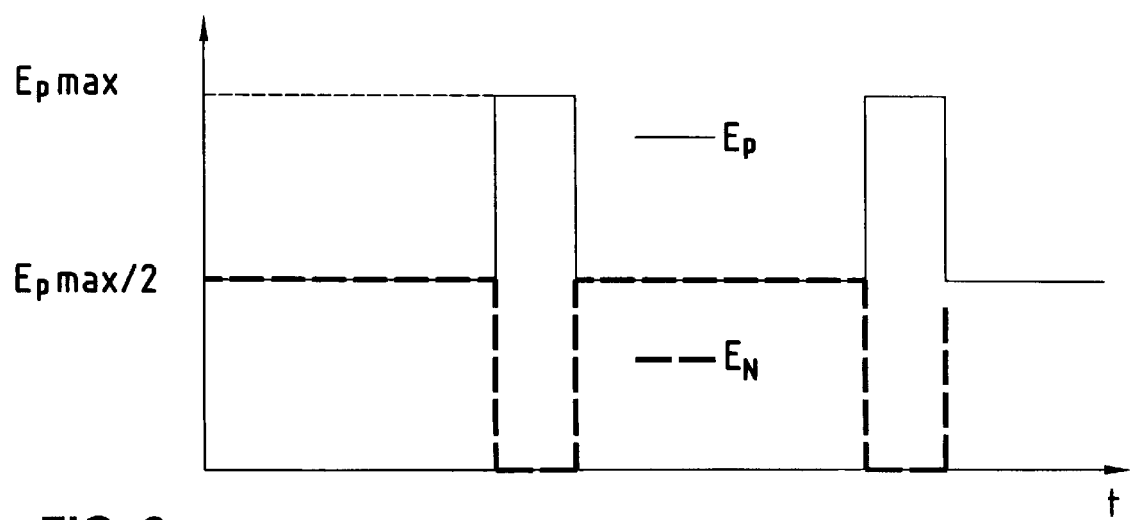
FIG. 8

ELECTRONIC CIRCUIT AND METHOD FOR A DIMENSION-MEASURING DEVICE

BACKGROUND OF THE INVENTION

Field of the Invention

This invention relates to measuring equipment, and more particularly to an electronic circuit for a dimension-measuring device having magnetoresistive electrodes, of the type including an electronic feed circuit supplying at least one feed voltage intended to feed a network of magnetoresistive electrodes and a measuring circuit having at least one input intended to be connected to the network and supplying at least one magnitude dependent upon the resistance of at least one of the magnetoresistive electrodes of the network.

The invention further relates to a dimension-measuring device having magnetoresistive electrodes and to a method of measuring by means of such a device of the type including the steps of feeding Wheatstone bridges with feed voltages and determining the position of a sensor along a scale with the aid of two dephased signals received at the outputs of the Wheatstone bridges.

Electronic devices for measuring length or angular position, e.g., in industry, must generally satisfy a number of partially contradictory requirements. They must furnish sufficient precision and resolution and be usable in environments subject to vibration or to pollution such as dust, oil, or humidity. Also expected of such sensors are easy integration into compact apparatus, without significant adjustment or adaptation, high-speed measurement, and low power consumption, all at the lowest possible cost.

Various types of measuring devices, based upon different physical principles, have been developed to satisfy these various requirements. In particular, measuring systems utilizing capacitance variations caused by the movement of a sensor opposite a scale have been used to a great extent in portable equipment such as gauges, for example. Such devices must be kept quite clean in order to operate and are therefore not very suitable for operation in an environment which is humid or subject to the spraying of lubricant or cutting oil, for example.

Devices for measuring length based upon the magnetoresistive electrode principle offering much greater resistance to soiling have been proposed, e.g., in German Patent No. 4,233,331 to IMO. The device described there includes a sensor provided with a network of magnetoresistive electrodes connected so as to define two Wheatstone bridges. The sensor is mounted on a slide and can move opposite a magnetized scale having a magnetization period $\lambda$.

Movement of the sensor opposite the scale causes a modification of the magnetic field applied to the various magnetoresistive electrodes of the sensor, and thus a change in their resistance. By applying a voltage to the Wheatstone bridges, an electric signal is produced at their outputs as a periodic function of the position of the sensor along the scale.

The two Wheatstone bridges are made up of four magnetoresistive electrodes dephased by $\lambda/2$. The corresponding electrodes of each bridge occupy positions dephased by $\lambda/4$. The electrodes of the two bridges are mixed. The aforementioned patent further suggests the use of barberpole structures which allow the direction of the current vector I to be modified. As the resistance of a magnetoresistive electrode is a function of the angle between the magnetization vector and the current vector, the barberpole structures allow control of the direction and amplitude of the variation in resistance of the electrodes caused by the movement of the sensor.

Each arm of the Wheatstone bridge is made up of a single magnetoresistive electrode which must be wide enough to react to the relatively small magnetic fields generated by the scale. The resistance of the arms of the bridge is therefore low, and sizable currents circulate across the measuring bridges. Consequently, the power consumption of this device is high.

U.S. Pat. No. 5,386,642 to Heidenhain describes a sensor in which the electrodes are organized into Wheatstone bridges, each arm of which is made up of several magnetoresistive electrodes of the same phase and connected in series. Thus, the resistance of the arms of the bridges is greater, allowing the power consumption to be appreciably reduced. However, the consumption of this type of sensor remains too high to contemplate its use in electrically autonomous equipment such as portable precision gauges.

SUMMARY OF THE INVENTION

It is an object of this invention to provide an electronic circuit for a dimension-measuring device of the magnetoresistive type presenting improvements as compared with prior art circuits.

A particular object of this invention is to provide a circuit allowing the use of a magnetoresistive sensor in portable measuring equipment such as a battery-powered slide caliper.

To this end, in the electronic circuit according to the present invention, of the type initially mentioned, the feed circuit periodically modifies the electric feed voltage supplied so as temporarily to lessen the dissipation of energy in the magnetoresistive electrodes.

The dimension-measuring device according to this invention includes a scale provided with a series of magnetized zones, a sensor capable of moving parallel to and opposite the scale and provided with a network of magnetoresistive electrodes, an electric circuit for feeding this network, and a measuring circuit supplying at least one magnitude dependent upon the resistance of at least one of the magnetoresistive electrodes when the network is powered, the electric feed circuit periodically reducing the electric feed of the network so as temporarily to lessen the dissipation of energy in the magnetoresistive electrodes.

The method according to this invention, of the type initially mentioned, comprises the further step of periodically reducing the feed of the measuring bridges so as temporarily to lessen the dissipation of energy in the magnetoresistive electrodes.

A preferred embodiment of the invention will now be described in detail with reference to the accompanying drawings, in which:

BRIEF DESCRIPTION OF THE DRAWINGS

FIG. 7 is a representation of the evolution of signals c and s; and

FIG. 8 is a chronogram of the feed signals of the Wheatstone bridges according to the invention.

DESCRIPTION OF THE INVENTION

Figure 1:
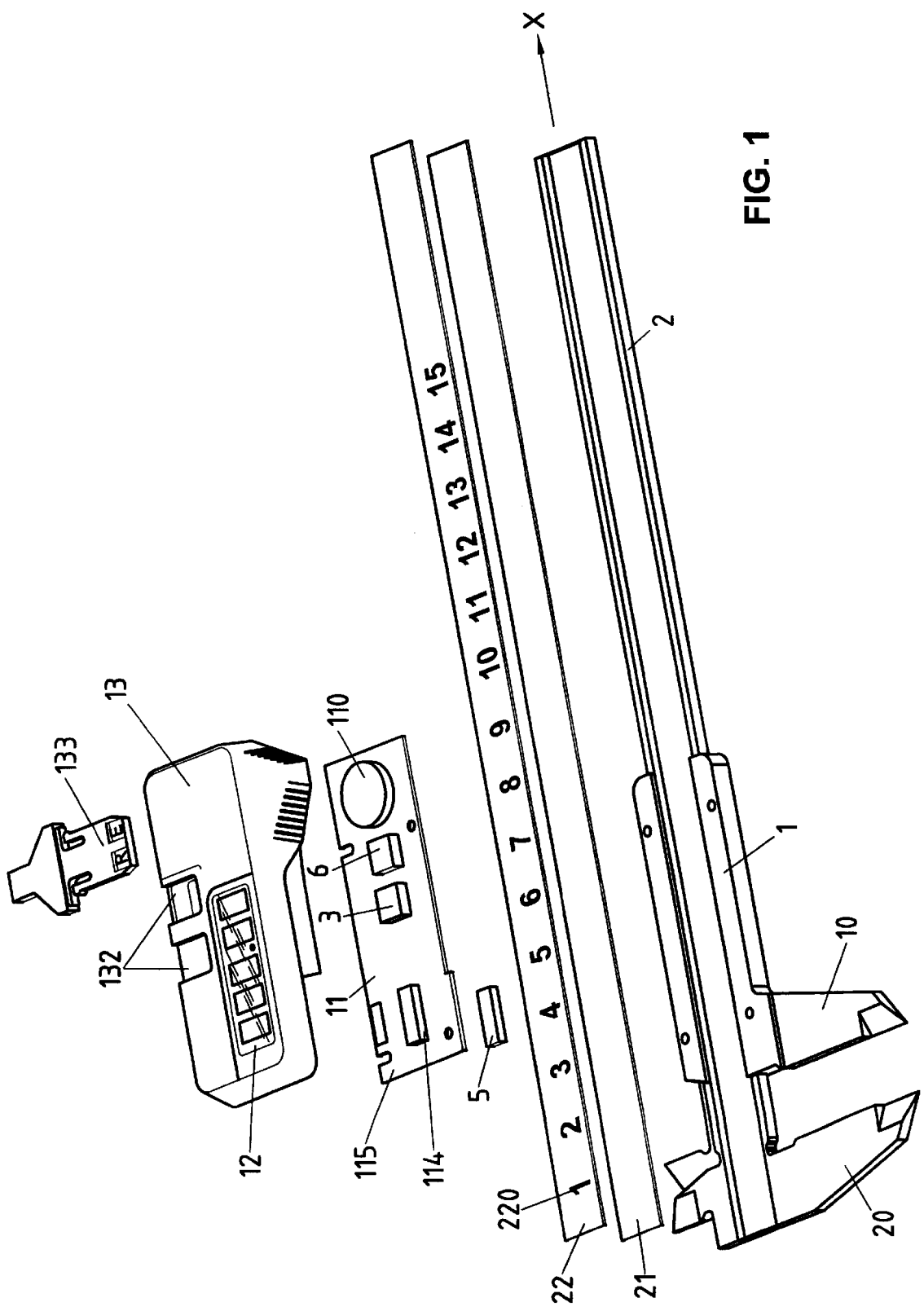
FIG. 1 is an exploded view of a portable electronic gauge according to the present invention.

FIG. 1 is an exploded view illustrating a portable electronic gauge according to the present invention. The design of such gauges forms part of the prior art and has been described, for example, in applicant's European Patent Application Publication No. 0 719 999, the contents of which are incorporated in this specification by reference.

The inventive gauge includes a bar 2 and a slide 1 capable of being moved along bar 2 longitudinally. Slide 1 is provided with a movable jaw 10, while bar 2 is equipped with a fixed jaw 20. A scale 21 of permanently magnetic material is fastened to bar 2 and provided with a series of magnetized zones 23, 24 (see FIG. 2). The magnetization period is $\lambda$. Scale 21 is covered with a protective layer of non-magnetic material 22 bearing a printed graduation 220.

Electronic means, generally indicated by reference numeral 11, permit an indication depending upon the distance between gauge jaws 10 and 20 to be displayed on an electronic LCD 12. These electronic means are assembled directly on a printed circuit board 115. They mainly include a magnetoresistive sensor 5 assembled on circuit board 115 opposite magnetic scale 21. Sensor 5 comprises a network formed of a large number of magnetoresistive electrodes organized in groups, the values of the various resistors of the network being a period function of the position of slide 1 along bar 2. The sensor may, for example, be of the type described in one of the prior art references mentioned earlier, German Patent No. 4,233,331 or U.S. Pat. No. 5,386,642, or preferably as described in applicant's European Patent Application Publication No. 0 877 228, the contents of which are incorporated in the present specification by reference. Electronic means 11 further include autonomous electric feed means, a battery 110 in the embodiment illustrated. Battery 110 is preferably a flat lithium battery and must guarantee the device several hours, or preferably even several months, of autonomous operation.

An ASIC-type electronic integrated circuit 3 determines from the resistance values of the magnetoresistive electrodes on sensor 5 at least one parameter dependent on the distance between jaws 10 and 20; electronic circuit 3 is connected to a standard microcontroller 6 controlling circuit 3 and also display 12 for displaying the distance measured.

Electronic means 11 are protected by a case 13, with buttons 132 for turning on the gauge, for instance, or for other functions such as resetting, adding or averaging successive measurements, etc. An optoelectronic serial connector 133 is provided as an interface between the gauge and outside instruments such as a printer, a PC, or a machine, for example.

Figure 2:
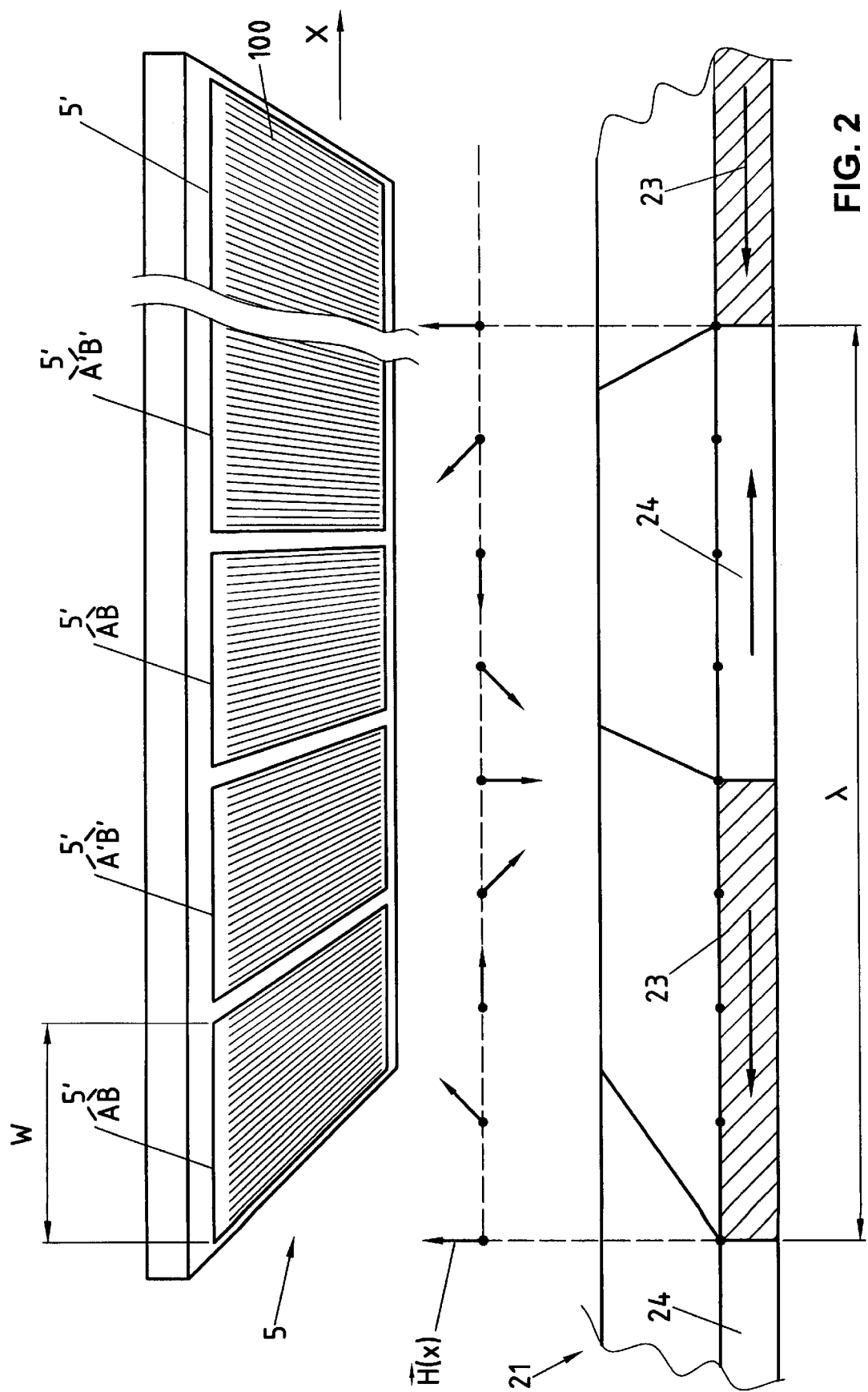
FIG. 2 is a diagrammatic perspective view of a scale portion and a sensor portion, several groups of magnetoresistive electrodes being visible on the sensor portion, also illustrating the magnetic field H(x) produced by the scale portion on the sensor portion.

The magnetoresistive sensor 5 comprises a large number of parallel magnetoresistive electrodes 100, shown diagrammatically in FIG. 2. The size of electrodes 100 is such as to procure high resistance and hence to reduce the power consumption of the sensor.

The various magnetoresistive electrodes 100 are disposed longitudinally on sensor 5 so as to occupy various phase positions in relation to the magnetic field $H_x(x)$ of period $\lambda$ generated by scale 21. At a sufficient distance from scale 21, the magnetic field is an approximately sinusoidal function of x. The magnetic field produced by scale 21 on each magnetoresistive electrode 100 is therefore a sinusoidal function of the longitudinal position of that electrode; the resistance of each electrode 100 evolves sinusoidally when slide 1 is moved along bar 2. Measuring circuit 3, 6 determines the position of slide 1 with the aid of the resistance values of the various electrodes 100 and displays this information on display 12.

Figure 3:
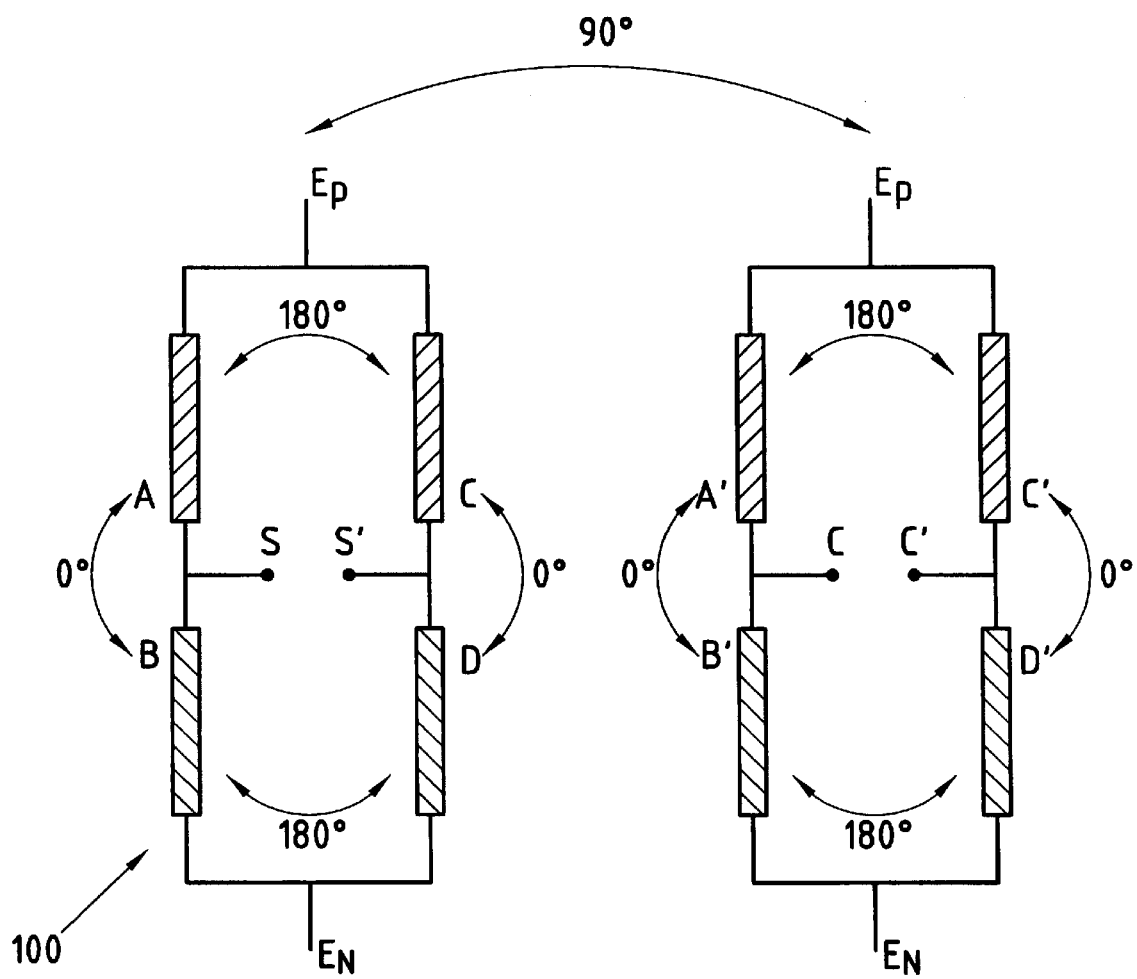
FIG. 3 is an electrical diagram illustrating the way in which the different scale electrodes are connected to constitute two measuring bridges.

FIG. 3 illustrates diagrammatically a preferred mode of connecting electrodes 100. The magnetoresistive electrodes are interconnected in this example so as to define two measuring bridges (Wheatstone bridges). The corresponding electrodes of each bridge are dephased by 90°, i.e., by $\lambda/4$. Each bridge comprises four sets of magnetoresistive electrodes ABCD and A'B'C'D', respectively. Other modes of connection, e.g., with one or three measuring bridges, may also be used within the scope of this invention.

The number of magnetoresistive electrodes per set is preferably greater than four but is limited only by the size of integrated circuit 5; in one embodiment of the invention, there are 72 magnetoresistive electrodes per set. The total number of magnetoresistive electrodes 100 on sensor 5 in this non-limiting embodiment, having two measuring bridges composed of four sets of 72 electrodes each, is therefore equal to 576.

The electrodes making up each set are connected in series and distributed so as to occupy close phase positions, e.g., positions between ($k\lambda-w/2$ and $k\lambda+w/2$), wherein k is a whole number and w is a parameter indicating the spread of the electrodes of each set. In the embodiment illustrated in FIG. 2, w equals $\lambda/4$. An assembly of contiguous electrodes coming from the same set and spread over w is called a group and is indicated by reference numeral 5' in FIG. 2. This configuration makes it possible to obtain a resultant of the resistances of the electrode sets A to D' which is the average of the electrode resistances spread over an interval of width w. In a second, preferred modification, which may be combined with the first one, each set includes electrodes positioned with phase shifts of 180° but with opposite barberpole structure orientations, e.g., at +45° and −45°.

In FIG. 3, electrode sets A and A' are dephased by 180° in relation to electrode sets C and C', respectively. In the same way, electrode sets B and B' are dephased by 180° in relation to electrode sets D and D', respectively. Sets A, A', B, B' occupy the same phase positions as the respective sets B, B', D, D'. The magnetoresistive electrodes of each pair AB, A'B', CD, C'D' are, however, provided with barberpole structures oriented oppositely, e.g., at +45° and −45°.

The two bridges are powered between terminals $E_P$ and $E_N$. The signals at the outputs of the bridges are gathered between points S, S' and C, C', respectively. The signal between points C and C' is dephased by 90° in relation to the signal between points S and S'.

Figure 4:
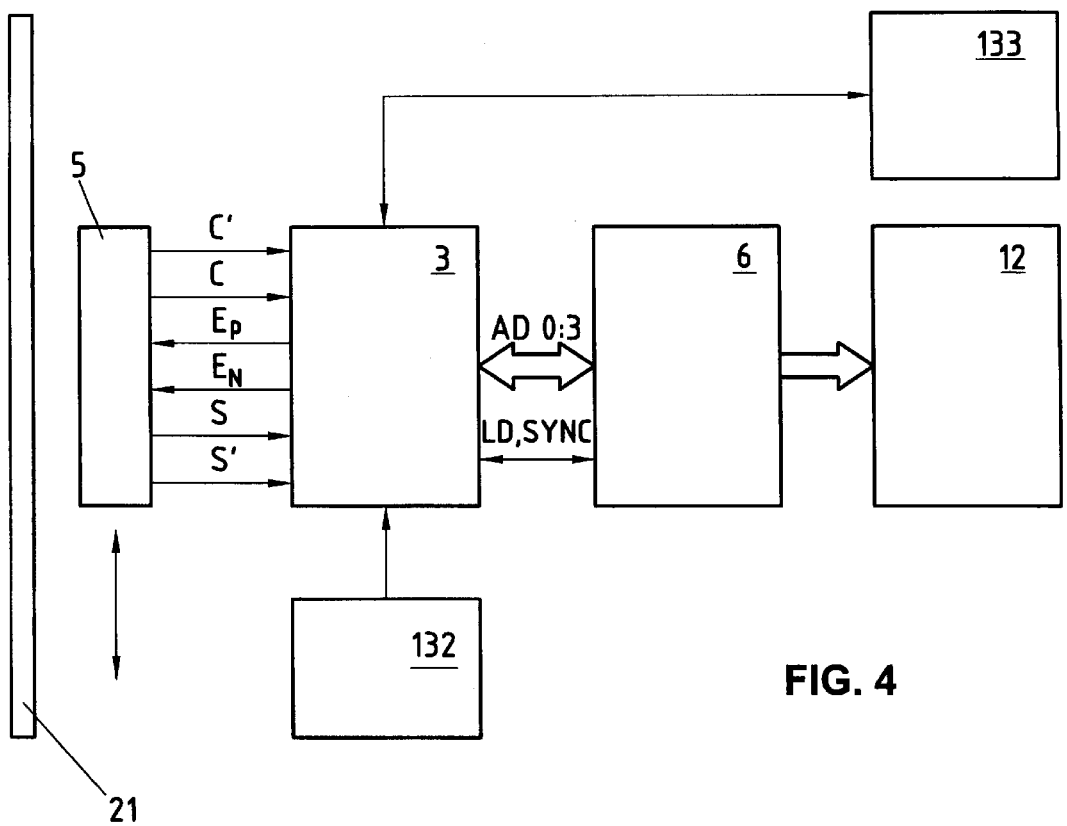
FIG. 4 is an overall diagrammatic view of the various elements making up the portable gauge according to the present invention.

The overall architecture of the inventive measuring device will now be discussed with reference to FIG. 4.

The Wheatstone bridges in sensor 5 are powered by circuit 3 between voltages $E_P$ and $E_N$. When slide 1 is moved opposite scale 21, the Wheatstone bridges return approximately sinusoidal differential signals c (between terminals C and C') and s (between terminals S and S') as a function of the position of sensor 5, one signal being dephased by 90 degrees in relation to the other. These signals are transmitted to electronic circuit 3 which, as will be discussed below with reference to FIG. 5, determines the position of sensor 5 on the basis of these signals. Electronic circuit 3 further controls the interface with a keyboard 132, as well as an optional interface with outside apparatus, e.g., an RS232 serial interface 133.

The inventive measuring device further preferably comprises a small parameter random-access memory (PRAM), not shown, for storing certain parameters such as the choice of measurement unit, etc. This memory zone may also be integrated in circuit 3 or microcontroller 6.

Figure 5:
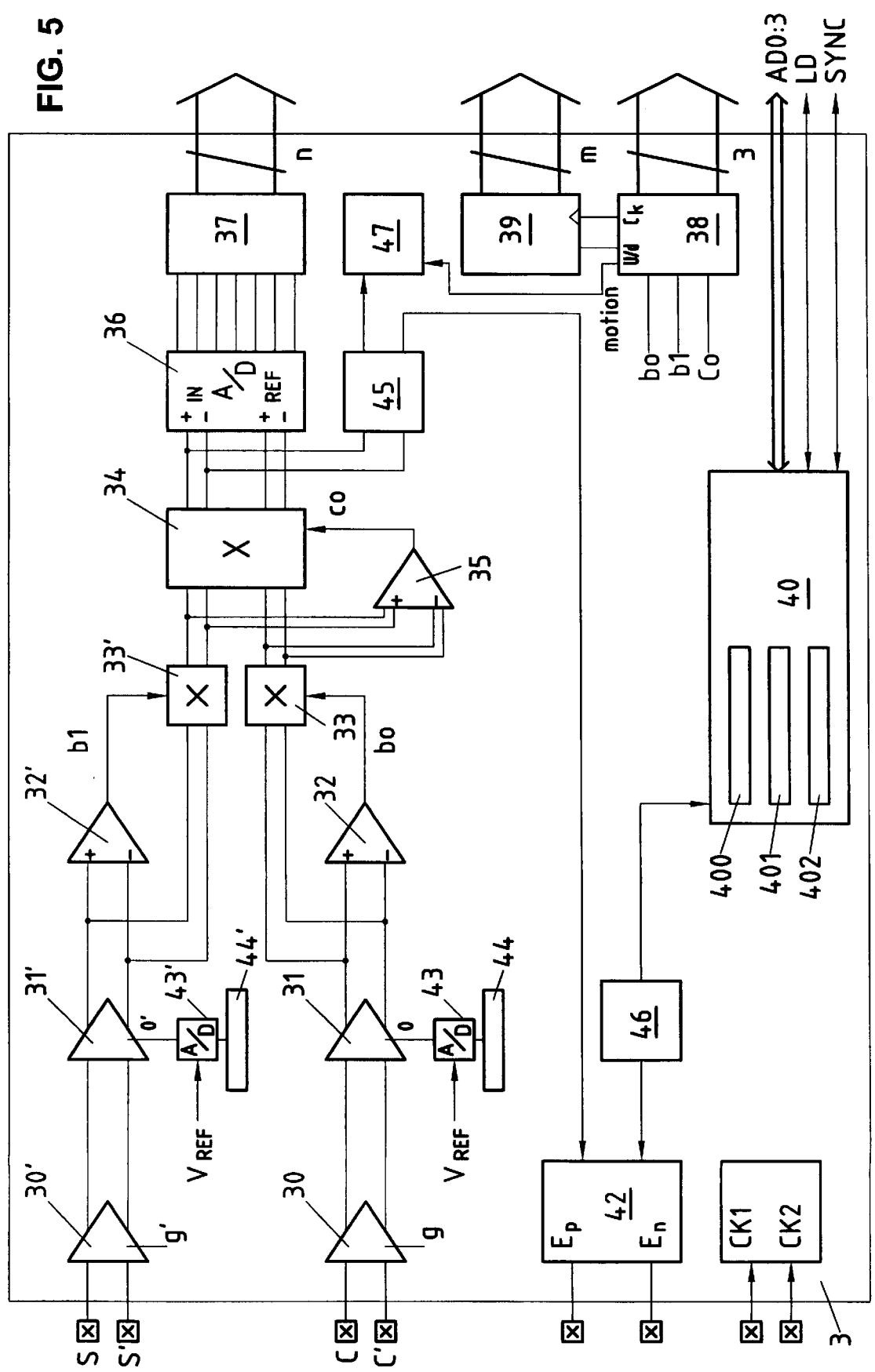
FIG. 5 is a block diagram of the main elements making up the electronic circuit according to the invention.

The main elements of electronic circuit 3 are shown in detail in FIG. 5. The operation of circuit 3 is controlled by microcontroller 6 by means of controlling registers 400 to 402 readable and writable from outside circuit 3. The position determined by circuit 3 is likewise stored in one or more result registers readable from microcontroller 6. Microcontroller 6 executes a program to control the operation of circuit 3, to display the results obtained on display 12, and to implement the specific instrument functions such as unit conversions, zero calibration, error checking, checking the standby mode and interrupts of circuit 3, etc. In the embodiment illustrated in FIG. 5, only three controlling and/or result registers 400 to 402 are shown, it being understood that this number is by no means limiting.

Sinusoidal signals s (terminals S–S') and cosinusoidal signals c (C–C') supplied by sensor 5 are amplified by a variable gain g amplifier 30, 30', then by a second amplification stage 31, 31' with offset O compensation in order to bring them up to a sufficient level for analog-to-digital conversion.

Figure 6:
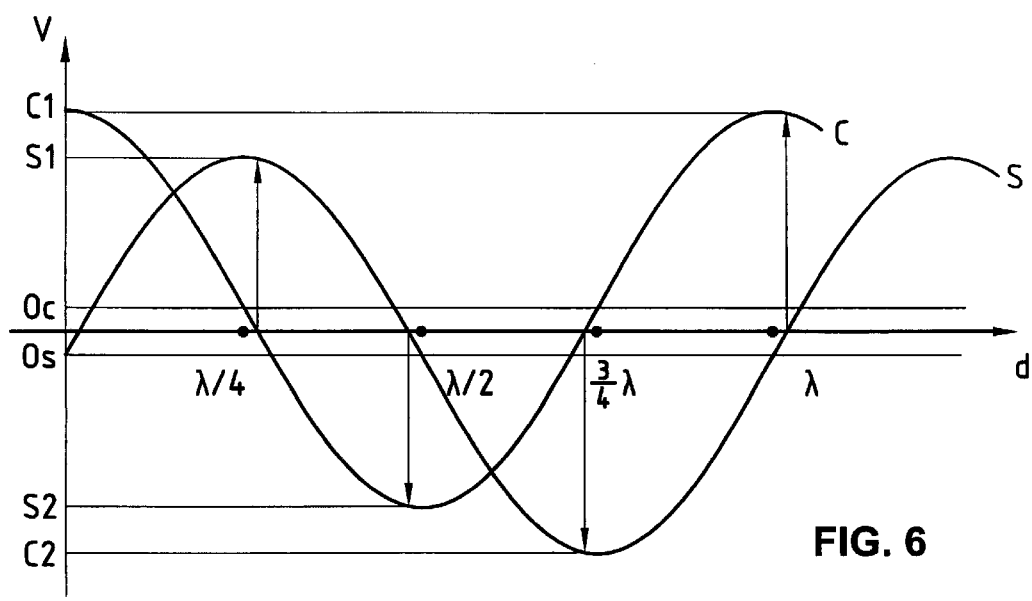
FIG. 6 is a diagram illustrating the evolution of signals c and s supplied by the sensor and amplified in the electronic circuit.

The signals at the outputs of amplifiers 32, 32' are illustrated in FIG. 6. It will be seen that the shapes of the differential signals on each of the channels C and S are very substantially sinusoidal but that they comprise offsets $O_c$ and $O_s$, respectively. The main cause of offset in the system is due to asymmetries of the arms of the Wheatstone bridges on sensor 5. This type of offset is proportional to the feed voltage of the bridges $E_p$–$E_n$. Other causes of offset are due to amplifiers 30, 31 in particular.

To guarantee optimum measuring accuracy, these offsets must be compensated for. An offset compensation value for each channel is determined during a calibration procedure and stored in registers 44, 44' (FIG. 5). This value is converted by converters 43, 43' into an offset compensation analog signal O, O' for offset compensation amplifiers 31, 31'. The reference voltage $V_{REF}$ of converters 43, 43' is proportional to the feed voltage of the bridges $E_p$–$E_n$, so as to compensate for the influence of this voltage on the offset of sensor 5.

The offset compensation value is determined during the calibration procedure by sampling two values $S_1$, $S_2$ and $C_1$, $C_2$, respectively, symmetrical in relation to the next extremes of each channel. The offset of channel C is thus determined by sampling the values of the signal on this channel when signal S passes zero, and vice versa (see FIG. 6). Owing to the sinusoidal shapes of the signals, the two sampling values $C_1$ and $C_2$ are symmetrical in relation to the offset voltage $O_c$ of this channel; this voltage can then be determined simply by the equation $O_c=(C_1+C_2)/2$. The values $C_1$ and $C_2$ are sampled by an analog-to-digital converter 36 placed by means of suitable registers in a calibration mode; the offset compensation value $O_c$ is calculated according to the above equation by microcontroller 6 and stored by it in register 44. A similar procedure may be used to determine, on the basis of values $S_1$ and $S_2$, the offset compensation value to be stored in register 44' of the other channel S.

This calibration process is carried out, as necessary, just once during the life of the instrument, or each time a battery is replaced, or at regular intervals, e.g., every few seconds, to compensate for any potential variation due, for instance, to the temperature, to the charge level of the battery, to aging, etc.

Maximum precision is required when the sensor is stationary, i.e., when the sensor supplies a virtually continuous signal. It is therefore important to design amplifiers 30, 30', 31, 31' and the path of the signals so that they generate a very faint noise 1/f.

As may be clearly seen from FIG. 6, each differential signal C, S passes zero twice at the time of each movement of the sensor in a period λ. This situation is illustrated diagrammatically in FIG. 7. Four quadrants A, B, C, D may be defined according to the polarity of the two signals C and S. The evolution of signals C and S at the time of a movement in the positive direction of the sensor is illustrated by the arrow. One quadrant corresponds to one area of movement of λ/4. By comparing the absolute values of these two signals (|C| and |S|), eight octants, corresponding to areas of λ/8, may be defined.

The octant in which the sensor is situated is determined by means of three comparators 32, 32', and 35. Comparator 32 supplies a bit $b_0$ to 1 when signal C on the first channel is positive. Comparator 32' supplies a bit $b_1$ to 1 when signal S on the second channel is positive. A third bit $c_0$ indicating the octant is determined by means of the differential comparator 35 and is equal to 1 when |C|>|S|. These relationships are summed up in the following table:

| Octant | c  | $b_0$ | s  | $b_1$ | $c_0$ |
|--------|----|----|----|----|----|
| 1 | >0 | 1 | >0 | 1 | 1 |
| 2 | >0 | 1 | >0 | 1 | 0 |
| 3 | <0 | 0 | >0 | 1 | 0 |
| 4 | <0 | 0 | >0 | 1 | 1 |
| 5 | <0 | 0 | <0 | 0 | 1 |
| 6 | <0 | 0 | <0 | 0 | 0 |
| 7 | >0 | 1 | <0 | 0 | 0 |
| 8 | >0 | 1 | <0 | 0 | 1 |

The most significant bits of the result are determined by means of a bidirectional counter 38 which counts the number of periods λ traversed by sensor 5 from the start of measuring. The movements in the direction of the arrow in FIG. 7 are added, while the movements in the opposite direction are decremented. A combinational logic 39, not detailed, converts the three bits of octants $b_0$, $b_1$, and $c_0$ into incrementation/decrementation signals u/d and clock signals ck for counter 39. The number m of bits of the counter depends upon the number of periods λ on the scale 21; for example, if period λ is equal to 1 millimeter, and the length of scale 25 is 25 centimeters, the sensor can traverse a maximum of 250 periods, which can be indicated with 8 bits.

The position within the period can be determined more precisely by means of the octant indication supplied by bits $b_0$, $b_1$, and $c_0$. This indication is converted by means of combinational logic 38 into three bits of intermediate significance according to the binary system. Circuit 38 further supplies a motion signal upon each change of quadrant; the function of this signal will be indicated below.

The resolution furnished by this rough measuring system is therefore λ/8, or 125 μm in the foregoing example. To obtain a finer resolution, a fine measuring system is necessary. This system may possibly be disconnected when the sensor is moving, as explained below.

The fine measurement is obtained by interpolating the position x of the sensor within the octant, according to the equation:

$$x = \frac{p}{2\pi}\tan^{-1}\frac{S}{C}$$

This division is effected by means of analog-to-digital converter 36, which converts the (differential) signal at the input IN into a digital signal. The other signal at the denominator is supplied to the (differential) reference input of converter 36; division of signal IN by signal REF and the digital conversion of the result are thus carried out in a single operation. The digital result of the division is supplied as address input to a conversion table 37 (ROM), which converts the tangent into its inverse and thus directly supplies the n least significant bits of the result.

The most significant and least significant bits of the result may be either supplied directly to microcontroller 6 or preferably first stored in result registers among registers 400–402.

To limit the size of table 37, all the operations are brought back to the first octant. An inverter 33 inverts differential signal C when $b_0$ is 0, i.e., when signal C is negative (quadrants B and C). Inverter 33' inverts differential signal C when $b_1$ is 0, i.e., when signal S is negative (quadrants C and D). An element 34, controlled by a bit $c_0$, transposes signals C and S when $c_0$ is 0, i.e., when the signal is in the second octant.

The operations of elements 33, 33', and 34 may be controlled by means of registers which are readable-writable from outside circuit 3 across an interface 40, address and data lines AD0:3, and corresponding signals LD and SYNC.

Electronic circuit 3 is likewise responsible for the electric feed of the Wheatstone bridges in sensor 5. If the total resultant resistance of the bridges of sensor 5 is 30 kΩ, for example, and the feed voltage is 3 V, the power consumption in magnetoresistive electrodes 100 is therefore about 100 μA. According to an important characteristic of the invention, these bridges (ABCD, A'B'C'D') are not powered continuously, in order to lessen the dissipation of energy.

A preferred shape of the feeding signals of bridges $E_P$ and $E_N$ is illustrated in FIG. 8. The potential of pin $E_P$ varies between the maximum potential $E_P$max (e.g., equal to Vdd) and half of that potential, $E_P$max/2. The potential of pin $E_N$ varies between $E_P$max/2 and Vss (0 volts). This configuration makes it possible to keep input amplifiers 30, 30' from being subjected to too great voltage surges and therefore to use input amplifiers having a less critical common mode rejection rate (CMRR). Moreover, the consumption to the the charging/discharging of the stray capacitances $C_{par}$ is reduced by half:

$$C_{par}(E_P\text{max}/2)^2 f + C_{par}(E_P\text{max}/2)^2 f = \tfrac{1}{2}C_{par}(E_P\text{max}/2)^2 f$$

Furthermore this configuration makes it possible to reduce the switchover time between the feeding intervals and the feed-reduction intervals and to compensate for the stray coupling caused by the transitions of signal $E_P$ and by the complementary transitions of $E_N$.

Signals $E_P$ and $E_N$ are supplied by a sequence unit 42 based on clock signals from an oscillator 41 and the feed voltage of circuit Vdd. Oscillator 41 receives clock signals from a quartz crystal outside circuit 3. Unit 42 is produced using only conventional electronics technology and therefore need not be described in detail.

Suitable control registers among registers 400 to 402 define the operating cycle ratio between the feeding intervals and the feed-reduction intervals. For instance, two bits in one of these registers allow four operating cycle ratios to be selected: 100% (always powered), 50%, 25% (as shown), and 0% (stopped completely).

Other modes of feeding magnetoresistive electrodes 100 may be conceived according to the sensor used, e.g., feeding of current, non-differential feeding, etc.

Circuit 3 preferably comprises a frequency meter 45 which determines the frequency of the measuring signal and hence the speed of movement of the sensor. According to an optional feature of the invention, the operating cycle ratio of unit 42 depends upon the frequency detected: when the sensor moves rapidly, the bridges are then powered more often than when the sensor remains stationary. In a modification, the frequency meter may further be used to disconnect the fine measuring circuit (elements 36, 37) during rapid movements of the sensor in order to reduce power consumption.

The operating cycle ratio may further be controlled by a circuit 46 for detecting the charge level of battery 110 feeding the electronic circuit: when the battery supplies a voltage below a predefined minimum, the duration of the feeding intervals of magnetoresistive electrodes 100 is reduced. In a modification, fine measuring circuits 36, 37 are likewise disconnected at that moment. This situation is preferably indicated to the user by a suitable signal on display 12 displayed by controller 6 when it receives a corresponding interruption of circuit 3.

The state of the battery and the frequency may also be detected by microcontroller 6 which then controls the operating cycle by means of the mentioned control registers.

Circuit 3 may further comprise means (not shown) for synchronization between the fine and rough measuring systems, particularly if the characteristics of comparators 32, 32', and 35 are imperfect and the two systems might thus not agree on the estimate of the present quadrant.

The circuit preferably further comprises a standby-mode circuit 47. In standby mode, only the following components of circuit 3 remain powered: the parameter random-access memory, keyboard 132, interface 40, and possibly rough measuring circuit 30, 31, 32, 35, 38, 39 and oscillator circuit 41, 42. The components outside circuit 3, on the other hand, including microcontroller 6, are released.

The standby mode may be selected by microcontroller 6, e.g., by means of a suitable control register in interface 40, or by the battery-state detecting circuit 46. The circuit may then be reactivated by one of the following actions intercepted by standby circuit 47: using keyboard 132, movement of the sensor (detected by the motion bit indicated above), message received on serial interface 133, etc. Several standby modes may preferably be defined by means of suitable control registers: for example, wake-up by movement of the sensor is possible only if magnetoresistive electrodes 100 remain powered at least intermittently, which is not desirable in all standby modes.

Circuit 3 further contains communication circuits (not shown) for receiving and sending RS 232-type signals to optoelectronic serial interface 133.

Although the circuit described proves to be particularly advantageous in a measuring device of portable size, such as a slide caliper or micrometer, for instance, it is naturally also possible to use it in any type of fixed or mobile device for measuring longitudinal or angular dimensions.

Those skilled in the art will understand that some of the features of the circuit described may be used independently.

In particular, the offset-adjusting circuit described and claimed may be used independently of the particular embodiment of feed circuit 42. The invention therefore also relates to an electronic circuit 3 for a dimension-measuring device having magnetoresistive electrodes 100 and comprising a measuring circuit 30–39 including at least one input (C, C', S, S') intended to be connected to the network, this measuring circuit supplying at least one magnitude dependent upon the resistance of at least one of the magnetoresistive electrodes 100 of the network, characterized in that it further includes offset-adjusting means 43, 44, 43', 44' for adjusting the measuring offset. The invention therefore also relates to such an electronic circuit in which the offset-adjusting means include at least one offset compensation amplifier 31, 31' for each measuring channel, and wherein the offset-adjusting means include for each measuring channel a register 44, 44' indicating an offset compensation value and a digital-to-analog converter 43, 43' controlling the offset compensation amplifier, the reference voltage of the digital-to-analog converter being proportional to the feed voltage of the network of magnetoresistive electrodes 100.

What is claimed is:

1. An electronic circuit for a dimension-measuring device, said electronic circuit having magnetoresistive electrodes, wherein the improvement comprises:
    an electronic feed circuit having a battery for providing power, and said circuit supplying at least one feed voltage intended to feed a network of said magnetoresistive electrodes and said network includes at least four of said magnetoresistive electrodes being grouped as a set,
    a measuring circuit having at least one input intended to be connected to said network, said measuring circuit supplying at least one magnitude dependent upon the resistance of at least one of said magnetoresistive electrodes of said network,
    and means for causing said electronic feed circuit periodically to modify the electric feed voltage for temporarily lessening a dissipation of energy in said magnetoresistive electrodes of said network.

2. The electronic circuit of claim 1, further comprising two external terminals, wherein said feed voltage is supplied between said two external terminals, one of said terminals being powered by a maximum potential and the other by a potential close to 0 volts during feeding intervals, both of said terminals being powered by a potential close to half of said maximum potential during feed-reduction intervals.

3. The electronic circuit of claim 1, wherein the operating cycle ratio between feeding intervals and feed-reduction intervals depends on the frequency of the input signal.

4. The electronic circuit of claim 1, further comprising a control register writable from outside said circuit, wherein the operating cycle ratio between feeding intervals and feed-reduction intervals can be modified by means of said control register.

5. The electronic circuit of claim 1, further comprising a circuit for detecting the charge level of a battery feeding the electronic circuit, the operating cycle ratio between the feeding intervals and the feed-reduction intervals being reducible by said charge-level detection circuit.

6. The electronic circuit of claim 5, further comprising a plurality of control registers writable from outside the electronic circuit for defining the operation of said measuring and/or feeding circuits.

7. The electronic circuit of claim 1, further comprising offset-adjusting means for adjusting the measuring offset.

8. The electronic circuit of claim 7, wherein said offset-adjusting means include at least one offset compensation amplifier for each measuring channel.

9. The electronic circuit of claim 8, wherein said offset-adjusting means include for each measuring channel a register indicating an offset compensation value and a digital-to-analog converter controlling said offset compensation amplifier, the reference voltage of said digital-to-analog converter being proportional to said feed voltage.

10. The electronic circuit of claim 7, wherein said offset-adjusting means include offset determining means at the output of said measuring circuit.

11. The electronic circuit of claim 10, wherein said offset determining means include an analog-to-digital converter and means for sampling the signal at two symmetrical points in relation to the next extremes of the signal.

12. The electronic circuit of claim 1, wherein the inputs of the measuring channels are differential inputs.

13. The electronic circuit of claim 12, comprising n measuring channels connected to said network of magnetoresistive electrodes so as to receive n signals dephased by 360°/2n, wherein the magnitude supplied by said measuring circuit is determined on the basis of said n signals received.

14. The electronic circuit of claim 13, comprising two measuring channels intended to be connected to said network of magnetoresistive electrodes so as to receive two signals dephased by 90°, the magnitude supplied by said measuring circuit being determined on the basis of the ratio between the two signals received.

15. The electronic circuit of claim 14, comprising: an analog-to-digital converter having a signal input connected to one of said measuring channels and a reference input to the other of said measuring channels for supplying a digital result corresponding to the division of one said signal by the other, a conversion table having an output indicating a parameter corresponding to the inverse tangent or the inverse cotangent of said digital result.

16. The electronic circuit of claim 15, comprising controllable means for inversion and transposition of the signals supplied to the input of said analog-to-digital converter.

17. The electronic circuit of claim 1, comprising a rough measuring circuit having a bidirectional counter counting the number of periods traversed by a sensor from the beginning of the measurement, and a fine measuring circuit interpolating the position of said sensor within a period.

18. The electronic circuit of claim 17, comprising a standby-mode circuit, at least said rough measuring being powered and said fine measuring circuit being disconnected in one of the standby modes, said standby-mode circuit reactivating said fine measuring circuit as soon as a movement is detected.

19. A dimension-measuring device comprising:
    a scale provided with a series of magnetized zones,
    a sensor capable of moving parallel to and opposite said scale and provided with a network of magnetoresistive electrodes, and said network includes at least four of said magnetoresistive electrodes being grouped as a set,
    an electric circuit having a battery for providing power, and said circuit feeding said network, and
    a measuring circuit supplying at least one magnitude dependent upon the resistance of at least one of said magnetoresistive electrodes when said network is powered,
    said electric feed circuit periodically reducing the electric feed of said network for temporarily lessening the dissipation of energy in said magnetoresistive electrodes.

20. The measuring device of claim 19, wherein said network includes two terminals, said electric feed circuit supplying an electric voltage between said two terminals, and the voltage between said two terminals being periodically reduced.

21. The measuring device of claim 20, the potential of one of said terminals being maximum and that of the other of said terminals being close to 0 volts during feeding intervals, the two potentials being equal during feed-reduction intervals.

22. The measuring device of claim 19, said magnetoresistive electrodes being connected to constitute at least one Wheatstone bridge powered between said two terminals and having an output connected to the input of said measuring circuit.

23. The measuring device of claim 22, said magnetoresistive electrodes being connected to constitute a first and a second Wheatstone bridge, the output of said first Wheatstone bridge supplying a differential signal as a sinusoidal function of the position of said sensor along the scale, and the output of said second Wheatstone bridge supplying a differential signal as a cosinusoidal function of the position of said sensor along said scale.

24. The measuring device of claim 19, the operating cycle ratio between feeding intervals and feed-reduction intervals depending upon the speed of movement of said sensor.

25. The measuring device of claim 19, further comprising a detection circuit for detecting the charge level of the battery powering the electronic circuit, wherein the operating cycle ratio between feeding intervals and feed-reduction intervals being reducible by said detection circuit.

26. The measuring device of claim 19, comprising: a first integrated electronic circuit including at least said feeding and measuring circuits, and a digital portion including a plurality of control registers, a microcontroller connected to said first electronic circuit and capable of writing in said control registers, and an electronic display connected to said microcontroller for displaying a result dependent upon said measured magnitude.

27. A method of dimension measuring by means of a magnetoresistive measuring device comprising a scale provided with a series of magnetized zones and a sensor capable of moving parallel to and opposite the scale and provided with a network of magnetoresistive electrodes connected to constitute two Wheatstone bridges, comprising the following steps:

feeding the Wheatstone bridges with feed voltages, determining the position of the sensor along the scale with the aid of two dephased signals received at the outputs of the Wheatstone bridges, and periodically reducing the feeding of the measuring bridges for temporarily lessening the dissipation of energy in the magnetoresistive electrodes.

28. The method of claim 27, wherein said step of determining the position of the sensor along the scale includes a step of dividing one dephased signal by the other and determining the inverse tangent of the quotient.

29. The method of claim 28, comprising a further step of offset compensation by means of an offset compensation value determined during a calibrating operation.

30. A dimension-measuring device comprising:

a scale provided with a series of magnetized zones, a sensor capable of moving parallel to and opposite the scale and provided with a network of magnetoresistive electrodes connected so as to constitute at least one measuring bridge, an electric feed circuit of said at least one measuring bridge, and a measuring circuit supplying at least one magnitude dependent upon the resistance of at least one of the magnetoresistive electrodes when said at least one measuring bridge is powered, said measuring circuit having a plurality of control registers, and said at least one measuring bridge being alternately powered by said electric feed circuit, so as to lessen during at least one interval of limited duration the dissipation of energy in said magnetoresistive electrodes.

* * * * *